(12) United States Patent
Debnath et al.

(10) Patent No.: US 10,740,212 B2
(45) Date of Patent: Aug. 11, 2020

(54) CONTENT-LEVEL ANOMALY DETECTOR FOR SYSTEMS WITH LIMITED MEMORY

(71) Applicant: NEC Laboratories America, Inc., Princeton, NJ (US)

(72) Inventors: Biplob Debnath, Princeton, NJ (US); Hui Zhang, Princeton Junction, NJ (US); Erik Kruus, Hillsborough, NJ (US)

(73) Assignee: NEC Corporation (JP)

( * ) Notice: Subject to any disclaimer, the term of this patent is extended or adjusted under 35 U.S.C. 154(b) by 173 days.

(21) Appl. No.: 15/970,398

(22) Filed: May 3, 2018

(65) Prior Publication Data

US 2018/0349250 A1 Dec. 6, 2018

Related U.S. Application Data

(60) Provisional application No. 62/544,952, filed on Aug. 14, 2017, provisional application No. 62/513,741, filed on Jun. 1, 2017.

(51) Int. Cl.
| | |
|---|---|
| *G06F 11/00* | (2006.01) |
| *G06F 11/34* | (2006.01) |
| *G06F 11/36* | (2006.01) |
| *G06F 11/30* | (2006.01) |
| *G06F 11/07* | (2006.01) |

(52) U.S. Cl.
CPC ...... *G06F 11/3476* (2013.01); *G06F 11/0781* (2013.01); *G06F 11/3072* (2013.01); *G06F 11/3082* (2013.01); *G06F 11/3608* (2013.01)

(58) Field of Classification Search
CPC ............. G06F 11/3476; G06F 11/0781; G06F 11/3072; G06F 11/3082; G06F 11/3608; G06F 11/079; G06F 11/3447
See application file for complete search history.

(56) References Cited

U.S. PATENT DOCUMENTS

| | | | |
|---|---|---|---|
| 8,495,429 B2 | 7/2013 | Fu et al. | |
| 9,317,218 B1 | 4/2016 | Botelho et al. | |
| 2007/0028220 A1* | 2/2007 | Miller ................ | G05B 23/0278 717/124 |
| 2008/0270077 A1* | 10/2008 | Ozonat ............... | G06F 11/3409 702/186 |
| 2011/0296244 A1* | 12/2011 | Fu ....................... | G06F 11/3608 714/37 |
| 2014/0344622 A1 | 11/2014 | Huang et al. | |
| 2015/0025875 A1 | 1/2015 | Perrone | |

(Continued)

*Primary Examiner* — Joseph D Manoskey
(74) *Attorney, Agent, or Firm* — Joseph Kolodka

(57) ABSTRACT

Systems and methods for implementing content-level anomaly detection for devices having limited memory are provided. At least one log content model is generated based on training log content of training logs obtained from one or more sources associated with the computer system. The at least one log content model is transformed into at least one modified log content model to limit memory usage. Anomaly detection is performed for testing log content of testing logs obtained from one or more sources associated with the computer system based on the at least one modified log content model. In response to the anomaly detection identifying one or more anomalies associated with the testing log content, the one or more anomalies are output.

12 Claims, 5 Drawing Sheets

(56) References Cited

U.S. PATENT DOCUMENTS

2016/0253229 A1* 9/2016 Sade .................. G06F 11/0751
  714/37
2016/0350173 A1* 12/2016 Ahad ..................... H04L 67/02
2016/0371170 A1* 12/2016 Salunke ............. G06F 11/0754
2017/0236023 A1    8/2017 Debnath et al.
2018/0005133 A1*  1/2018 Caffrey ................ G06F 21/552

* cited by examiner

CONTENT-LEVEL ANOMALY DETECTOR FOR SYSTEMS WITH LIMITED MEMORY

RELATED APPLICATION INFORMATION

This application claims priority to U.S. Provisional Patent Application No. 62/513,741, filed on Jun. 1, 2017, and U.S. Provisional Patent Application No. 62/544,952, filed on Aug. 14, 2017, both incorporated by reference herein in their entirety.

BACKGROUND

Technical Field

The present invention relates to log analysis, and more particularly to a content-level anomaly detector.

Description of the Related Art

Logs are commonly used to record computer system behaviors and various states for maintenance and troubleshooting. Logs provide a continuous snapshot of the computer system behaviors and various states. By analyzing the contents of the logs, activities of interest can be troubleshooted. Anomaly detection of log data can be used to identify unusual log data patterns (e.g., outliers).

SUMMARY

According to an aspect of the present principles, a computer-implemented method is provided for implementing content-level anomaly detection for devices having limited memory. The method includes generating, by a processor operatively coupled to a memory, at least one log content model based on training log content of training logs obtained from one or more sources associated with the computer system, transforming, by the processor, the at least one log content model into at least one modified log content model to limit memory usage performing, by the processor, anomaly detection for testing log content of testing logs obtained from one or more sources associated with the computer system based on the at least one modified log content model, and in response to the anomaly detection identifying one or more anomalies associated with the testing log content, outputting, by the processor, the one or more anomalies.

According to another aspect of the present principles, a computer program product having program instructions embodied therewith is provided. The program instructions are executable by a computer to cause the computer to perform a method for implementing content-level anomaly detection for devices having limited memory. The method includes generating at least one log content model based on training log content of training logs obtained from one or more sources associated with the computer system, transforming the at least one log content model into at least one modified log content model to limit memory usage, performing anomaly detection for testing log content of testing logs obtained from one or more sources associated with the computer system based on the at least one modified log content model, and in response to the anomaly detection identifying one or more anomalies associated with the testing log content, outputting the one or more anomalies.

According to another aspect of the present principles, a system is provided for implementing content-level anomaly detection for devices having limited memory. The system includes a computer system, and at least one processor operatively coupled to a memory and configured to generate at least one log content model based on training log content of training logs obtained from one or more sources associated with the computer system, transform the at least one log content model into at least one modified log content model to limit memory usage, perform anomaly detection for testing log content of testing logs obtained from one or more sources associated with the computer system based on the at least one modified log content model, and in response to the anomaly detection identifying one or more anomalies associated with the testing log content, output the one or more anomalies.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
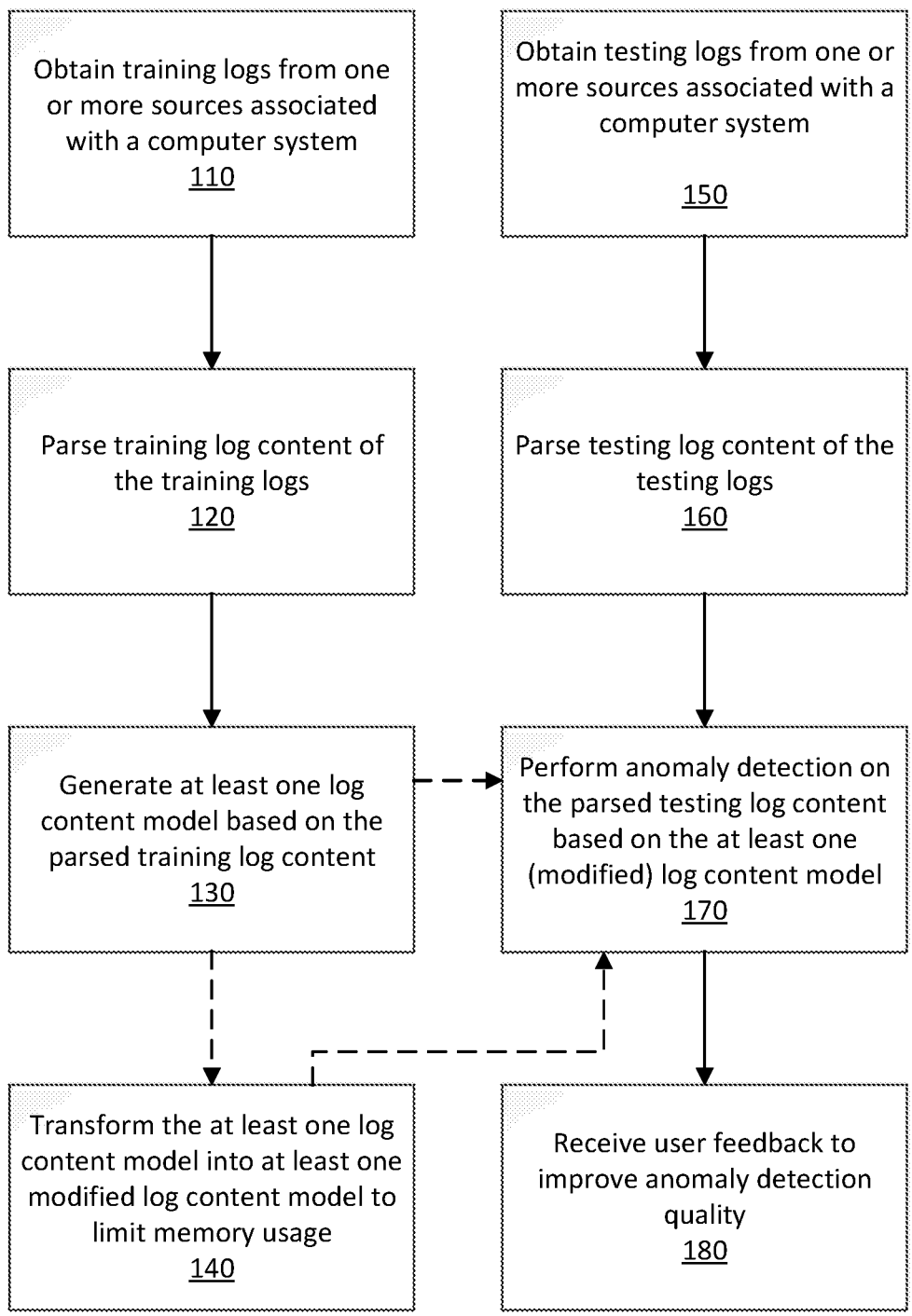
FIG. 1 is a block/flow diagram illustrating a system/method for performing content-level anomaly detection, in accordance with the present principles.

One simple mechanism to detect content-level anomalies is to parse every log into various tokens based on a set of delimiters (e.g., comma, colon, space, tab, etc.), and maintain an index to identify the unique tokens from a set of training (e.g., history) logs. During testing, if a log token is absent in the index, then that log message will be reported as an anomaly. One problem with this simple approach is that it can create many false positive results, which limits its usefulness for real-world deployment.

The embodiments described herein provide for systems and methods that can automatically analyze log content and detect anomalies if the log content is statistically different from normal working behavior. The embodiments described herein can include one or more of membership-testing, range checking and null models. Given a heterogeneous set of logs, a "best" model can be assigned to each individual log field based on a statistical nature of its contents.

The embodiments describe herein can work in two stages: (1) model building and (2) testing. In the model building phase, a statistical model is built or generated based on the contents of a set of training (e.g., history) logs. To build the statistical model, incoming logs are parsed into various fields. For every field, an index is maintained, where the index "key" is the content, and the index "value" is the frequency count. Based on the statistical property of the indexed contents of a field, one of following three attributes can be assigned to the field: IGNORE, MEMBER- SHIP_TEST, and RANGE_CHECK. Afterwards, users have the option to review this initial attribute assignment, and can change the initial attribute assignment to incorporate their domain knowledge. Users can also modify (e.g., add or delete) field index content to apply their domain knowledge.

In the testing phase, content-level anomalies for a set of testing logs are detected based on the model. During testing, incoming testing logs are parsed into various fields. For every field, an action is taken based on its model attribute. For example, if the model attribute is IGNORE, it is ignored. If model attribute is MEMBERSHIP_TEST, it is determined whether the current field content is present in the model's index. If the current field content is absent, then an anomaly alert is raised. If the model attribute is RANGE_CHECK, it is determined whether the current field content is present within the range of the model's index contents. If it is out of range, then an anomaly alert is raised. Users can then review all anomaly alerts and can provide feedback to correct false positive results. Based on user feedback, the field index model can be updated, which can improve the accuracy of the anomaly detection procedure.

The embodiments described herein have many applications that can improve the functioning of a computer, or provide other improvements to computer-related technology. For example, the embodiments described herein can transform log content models into modified log content models, such as by performing model compression, so that systems or devices having limited memory can employ the modified model to perform content-level anomaly detection.

An example of a system or device having limited memory is a device implemented within one or more layers of an Internet of Things (IoT) system architecture (e.g., device layer, gateway layer, data management layer and/or application layer). IoT involves machine-to-machine communications (M2M, and enables advanced connectivity of computing and embedded devices through internet infrastructure. However, logs are unstructured, and an acceptable logging standard is yet to be developed for IoT, most commonly due to the enormous varieties of "things" and their fast evolution over time. Accordingly, various challenges can arise employing conventional log analysis techniques to analyze IoT log messages, or log messages from other types of limited memory systems or devices.

The embodiments described herein can be applied to many real-world scenarios. Examples of real-world scenarios that can employ anomaly detection of computer system log data include, but are not limited to, intrusion and fraud detection (e.g., by identifying unusual data patterns in network traffic) and computing system maintenance (e.g., by detecting faults in computing systems). In the IoT context, continuous monitoring of connected machines within the IoT network may be needed to detect the existence of any anomaly or bug, and resolve such issues quickly to minimize downtime.

Referring now in detail to the figures in which like numerals represent the same or similar elements and initially to FIG. 1, a system/method 100 for content-level anomaly detection is illustratively depicted in accordance with one embodiment of the present principles.

At block 110, training logs are obtained from one or more sources. Each training log can include a time stamp and text content with one or more fields. In one embodiment, the training logs include heterogeneous logs. The one or more sources can include arbitrary and/or unknown systems or applications.

At block 120, content from the training logs is parsed. In one embodiment, the content is parsed into fields. The training logs can be parsed based on rules. For example, the training logs can be parsed based on one or more regular expressions. A regular expression is a sequence of characters that defines a search pattern. A regular expression can be used by a search process (e.g., string searching process) for performing one or more operations on strings (e.g., find operation).

The training logs can be parsed without any prior knowledge of the training log structures (e.g., format). If patterns are not provided (e.g., by a user), patterns can be automatically generated. In addition, log-to-pattern mapping can be efficiently identified, which can indicate the pattern(s) to be used to parse training log content.

Further details regarding block 120 will now be described with reference to FIG. 2.

Figure 2:
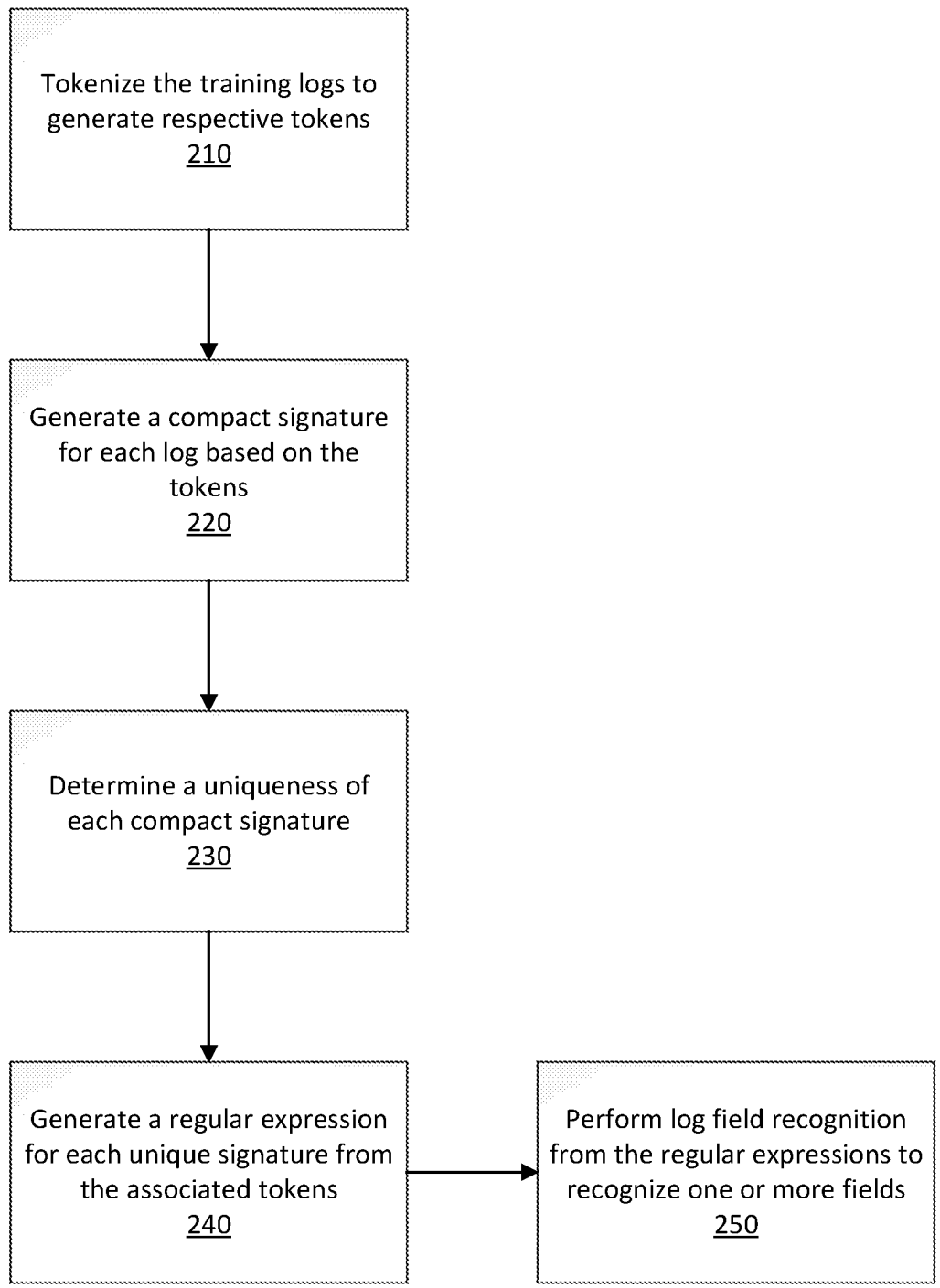
FIG. 2 is a block/flow diagram illustrating a system/method for parsing content from logs, in accordance with the present principles.

Referring now to FIG. 2, a system/method 200 for parsing content from logs, such as from the training logs of FIG. 1, is illustratively depicted in accordance with one embodiment of the present principles.

Figure 3:
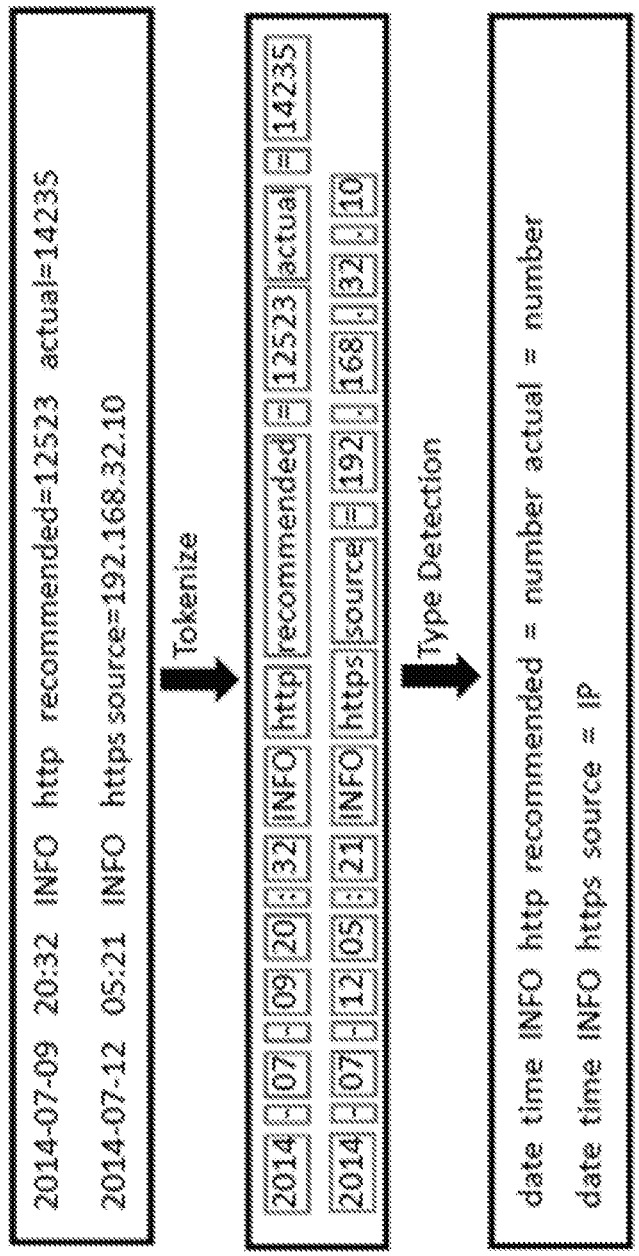
FIG. 3 illustrates an example of log tokenization, in accordance with the present principles.

At block 210, logs are tokenized to generate semantically meaningful tokens. The tokenizing can include splitting each log based on a delimiter (e.g., space or comma). Then, a set of pre-defined data types (e.g., date, time, internet protocol (IP) address and number) are detected, and the real values of these data types are replaced with the name of the data type. For example, a date of 2014 Jul. 9 can replaced with "date", an IP address of 192.168.32.10 can be replaced with "IP", a number 12523 can be replaced by "number", etc. This set of pre-defined data types can be changed based on user requirements, since the user may care about contents of a certain type. FIG. 3 depicts an illustrative example of how an exemplary log can be tokenized.

At block 220, a compact signature is generated for each log based on the tokens. In one embodiment, the compact signature is generated for a log by combining all of the tokens generated for a log at block 210 into a single word, and applying a function to the single word to generate a unique numerical value.

At block 230, a uniqueness of each compact signature generated at block 220 is determined. The uniqueness can be determined based on an index for all unique compact-signatures that is maintained. For example, every entry of the index can include a compact-signature as a "key" and its associated tokens as a "value". To determine the uniqueness, for every incoming log, the index is looked up using the corresponding compact signature. If a match is found, it means that a similar log pattern representing this incoming log has already been found, so no action needs to be taken. Otherwise, the index is updated at block 240 by storing the compact-signature with the associated token in the index. Note that memory needs sufficient space for storing this index to generate precise patterns. In addition, note that the index size does not depend on the total number of processed logs. Rather, the index size depends on the number of unique compact-signatures.

At block 250, a regular expression is generated for each unique signature (e.g., "key") from the associated tokens (e.g., "values").

At block 260, log field recognition is performed from the regular expressions generated at block 250 to recognize one or more fields. In one embodiment, the one or more fields can include one or more of time stamps, IP addresses, universal resource locators (URLs), etc. The one or more fields can be recognized based on prior knowledge about their syntax structures. Exemplary syntax structures are provided below with reference to Table 1. Fields which are highly stable in the logs are recognized as general constant fields in the regular expressions. The rest of the fields are recognized as general variable fields, including number fields, hybrid string fields and string fields.

TABLE 1

| Field Type | Regular Expression Syntax |
|---|---|
| WORD | [A-Za-z]+ |
| IP | [0-9]{1,3}.[\d]{1,3}.[\d]{1,3}.[\d]{1,3} |
| DATETIME | [\d]{4}/[\d]{2}/[\d]{2} [\d]{2}:[\d]{2}.[\d]{2}.[\d]{1,3} |
| NUMBER | -?[\d]+{.[\d]+)? |
| NOTSPACE | \S+ |

Referring back to FIG. 1, at block 130, at least one log content model is generated based on the parsed log content. Further details regarding generating the log content model will now be described with reference to FIG. 4.

Figure 4:
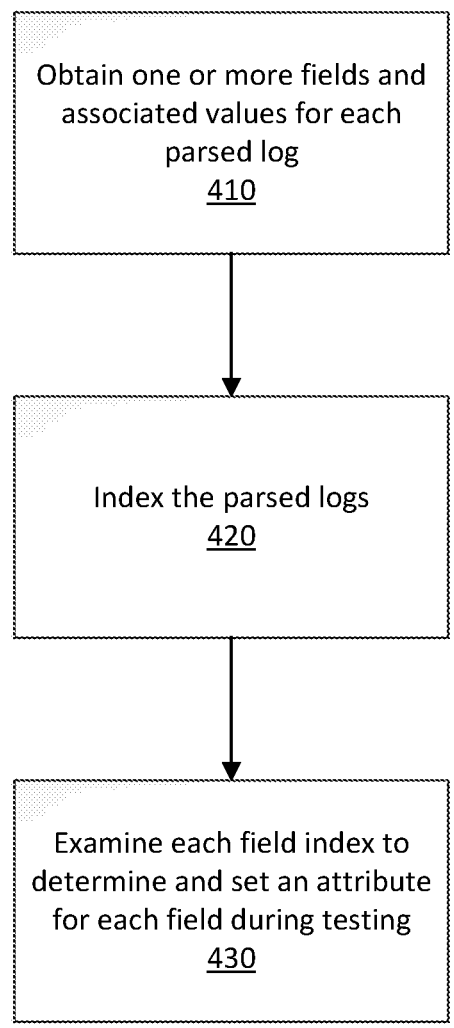
FIG. 4 is a block/flow diagram illustrating a system/method for generating log content models, in accordance with the present principles.

Referring now to FIG. 4, a system/method 400 for generating log content models is illustratively depicted in accordance with one embodiment of the present principles.

At block 410, one or more fields and associated values are obtained for each parsed log, such as the parsed logs output from block 120 in FIG. 1.

At block 420, the parsed logs are indexed. In one embodiment, an index is maintained for each field of the parsed logs. Each index includes information relating to the field content and a frequency counter. For example, an index "key" can represent the field content, and an index "value" can represent the frequency counter. To index the field content, for every obtained parsed log, all associated field indexes are looked up. If a match is found, it means that similar field content was already found before, and the frequency counter value is increased by one. Otherwise, the field content is stored in the associated field index, and the frequency counter value is increased from zero to one.

Very large index sizes can result in memory overflow problems. As a remedy, in one embodiment, a limit or threshold corresponding to a maximum number of unique field contents that can be indexed can be set, and if the number of unique field contents exceeds the limit, its attribute can be set to IGNORE. The limit can be set to a default value and/or can be specified/updated by a user. For example, the default value can be set to, e.g., 10,000. However, the default value can be set to any suitable value in accordance with the embodiments described herein.

At block 430, after all of the parsed logs are indexed, each field index is examined to determine and set an attribute for each field during testing. Such attributes can include, for example, IGNORE, MEMBERSHIP_TEST and RANGE_CHECK.

In one embodiment, the attribute for a field is determined based on a randomness of the field content. For example, field randomness can be quantified by the following equation:

$$\text{field\_randomness} = \frac{\text{unique\_content\_count}}{\text{total\_frequency\_count}},$$

where unique_content_count refers to the number of unique field contents and total_frequency_count refers to the total number of field contents.

To determine the attribute for a given field, the calculated field randomness for the given field is compared to a threshold field randomness value. The threshold field randomness value can be set to a default threshold field randomness value and/or can be specified/updated by a user. The threshold field randomness value should be sufficiently low to promote stability. For example, the default threshold field randomness value can be set to, e.g., 0.05. However, the default threshold field randomness value can be set to any suitable value in accordance with the embodiments described herein.

If the calculated field randomness for the given field exceeds the threshold field randomness value, the given field is treated as random and is set to IGNORE.

If calculated field randomness for the given field does not exceed the threshold field randomness value, the given field is not treated as random. In one embodiment, the given field can then be classified as either a numeric field or a nonnumeric field. The given field is classified as a numeric field if the field's keys include only numeric values, and otherwise the given field is classified as a nonnumeric field.

If the given field is a nonnumeric field, the attribute of the given field is set to MEMBERSHIP_TEST.

If the given field is numeric, the attribute of the given field can be set to either RANGE_CHECK or MEMBERSHIP_TEST. For example, if the cardinality (e.g., the number of unique field contents) for the given field exceeds a threshold cardinality value or includes at least one floating-point number (e.g., 123.0), or passes a coefficient of variation (COV) test, its attribute is set to RANGE_CHECK. If the attribute of the given field is not set to RANGE_CHECK, then its attribute is set to MEMBERSHIP_TEST.

The threshold cardinality value can be set to a default value and/or can be specified/updated by a user. For example, the default threshold cardinality value can be set to, e.g., 10. However, the default threshold cardinality value can be set to any suitable value in accordance with the embodiments described herein.

The COV test operates as follows. First, all the numeric values are sorted (e.g. in ascending order). Next, the differences between consecutive values are calculated. Then, the COV of the differences are calculated. The COV of the differences can be calculated as a ratio of the standard deviation of the differences to the mean value of the differences. To determine whether the COV test is passed, the COV is compared to threshold COV value. If the COV exceeds the threshold COV value, then the COV test is passed. The threshold COV value can be set to a default value and/or can be specified/updated by a user. For example, the default COV value can be set to, e.g., 0.05. However, the default COV value can be set to any suitable value in accordance with the embodiments described herein.

If users are not satisfied with the attributes generated at block 430, the users can manually change the attribute values, and the user specified attribute value for a field can then be employed to test the field contents during the testing phase for anomaly detection. Note that the users have options to delete any existing data (e.g., training log content) from the field index to reflect their domain knowledge. The users can also change the index by adding new field content (e.g., field content not present in the training logs) and/or frequency information. In one embodiment, the following three editing operations are supported: (1) editing a field attribute; (2) adding a new instance; and (3) deleting an instance.

In editing a field attribute, a user can change a field attribute from IGNORE to MEMBERSHIP_TESTING or RANGE_CHECKING; MEMBERSHIP_TESTING to IGNORE or RANGE_CHECKING; and RANGE_CHECKING to IGNORE or MEMBERSHIP_TESTING.

In adding a new instance, a user can, for example, add the number "100" to a field "P1F1" by specifying "P1F1 add 100". In deleting an instance, a user can, for example, delete "100" from "P1F1" by specifying "P1F1 delete 100".

Out-of-memory issues can occur due to large model size after editing an attribute from IGNORE to MEMBERSHIP_TESTING. A large model size can lead to memory overflow problems for systems having limited memory, such as embedded devices (e.g., IoT devices). To address these concerns, referring back to FIG. 1, at block 140, the at least one model can (optionally) be transformed into a modified log content model to limit memory usage so that a system having limited memory can perform anomaly detection in accordance with the embodiments described herein. In one embodiment, the transformation performed at block 140 includes compressing the at least one log content model. Such compression results in a tradeoff with accuracy of the anomaly detection results.

For example, for fields having IGNORE attributes, there may be no need to store any content in the final model(s) as these fields are not considered for detecting anomalies. For the fields having RANGE_CHECK attributes, only minimum and maximum values are stored to keep track of the data range, and none of the field contents need to be stored.

The training stage for fields having MEMBERSHIP_TESTING attributes results in a set of keys and associated counts. Fields having MEMBERSHIP_TESTING attributes can be compressed using compact data to limit memory usage. For example, during testing, the key+count data can be compressed using an approximate data structure (e.g., counting Bloom filter or counting quotient filter (CQF)). However, such compression can introduce at least one false positive value due to the computation using the approximate data structure. Since a false positive value leads to the value being considered present (even though it is actually not), the anomaly detection can fail to recognize some anomalies. In approximate data structures, key detection often relies not on exact key comparison, but on comparing f-bit fingerprints (or quotients) of keys. Each such comparison can generate a false positive with probability $1/2^f$. To correctly report virtually all anomalies, it is desirable to use a fingerprint size $f \geq 32$.

For a false positive rate $\varepsilon$, memory usage for Bloom filters is $\varepsilon \approx 1.44 * \log 2(1/\varepsilon)$, whereas filters that employ hash table constructions use $\varepsilon \approx (\log 2(1/\varepsilon) + \delta)/a$ bits per key. Here, a is the fill rate (e.g., load factor) and $\delta$ is a per-key overhead (e.g., 2 or 3 bits per key). For filters that employ hash table constructions, such as Cuckoo Filters, rank-and-select based quotient filters (RSQFs), etc., a can range from about, e.g., 0.95-0.98. At low false positive rates that interest us, filters that employ hash table constructions often use less memory than Bloom filters.

Choosing an in-memory data structure for anomaly detection in accordance with the embodiments described herein depends on the use case.

For example, if multiple user will simultaneously be using different count thresholds for a single MEMBERSHIP_TESTING key+count dataset, a single shared fixed counting quotient filter (CQF) ($\delta \sim 2.125$, $\alpha \sim 0.95$) is a reasonable in-memory data structure. However, if only one user will be doing membership testing, with a given occurrence threshold, count information during construction can be used to pre-prune the set of interesting keys so that counts do not need to be retained in memory.

To represent a fixed set of threshold keys, minimal perfect hash functions (MPHFs) indexing a full vector of f-bit fingerprints (e.g., $\alpha=1.0$) can be used. Performing only one fingerprint comparison, the false positive rate $\varepsilon$ can be represented by $\varepsilon=1/2^f$. Many MPHFs can be constructed using 2 or 3 bits per key, so memory usage of such MPHFs can be represented by $\log 2(1/\varepsilon)+x)/1.0$, where x is 2 or 3 (similar to Cuckoo Filters and RSQFs). However, since the hash table constructions do multiple fingerprint/quotient comparisons, they can incur higher false positive rates. The MPHF approach can use less memory and miss fewer anomalies. MPHF construction for the threshold set of keys can be performed once, at startup, and can yield lower false positives rates than CQF.

The general approach can be modified in several limited cases. Memory pressure can be reduced for extremely large key-sets by reducing the fingerprint/quotient size, down to some minimum useful size (e.g., 8 bits).

Optionally, a fingerprint size can be specified based on a desired accuracy from the detection algorithm. If a user does not choose fingerprint size, a maximal fingerprint size can be estimated based on a maximum memory limit of M bits (or the system's available memory) as follows. To store N keys in M bits, an MPHF uses $M/N \approx f+3$ bits/key. So, fingerprint length can be up to $f_{max} \sim M/N-3$ bits long. For M, a maximum memory size can be specified for each set. If unspecified, a reasonable global default $f_{max}$ is defined by using a percentage (50%) of the available memory. This is used for storing N keys from all MEMBERSHIP_TESTING key+count datasets with which anomalies are detected.

Another modification reflects a preference to use exact key matching to get zero false positives. It can be used when exact matching can be done quickly, and with no more memory than the $N*(f+3)$ bits of the MPHF (or CQF) data structure. Consider a single key+count dataset of N keys that with fingerprints would use about $M_{tot}=N*(f_{max}+3)$ bits. When there are very few keys and total key size is small, exact matching using a concise sorted vector or list can be both memory-friendly and efficient. This approach can be adapted to short variable-length strings and fixed-size numeric keys. If there are many keys, but they are all of small bit-length, then exact matching using an MPHF (or CQF) can be considered, and the key itself, possibly zero-extended or truncated, can be used as the fingerprint. This especially applies to sets of integers or floats.

For non-exact matching, fingerprints can be used with either MPHF or CQF. If the default fingerprint size $f_{max}$ is very large (e.g., 512 bits), then it could lead to performance problems as calculating larger fingerprints takes longer time. A potential remedy for this problem is to limit the fingerprint size. For example, the fingerprint size can be limited to multiples of 32 in power of 2 (e.g., 32, 64, 128) as there are many fast hash functions schemes that exist for these specific sizes. Examples of such hash function schemes that could be used to generate hash value for these sizes include, but are not limited to, CityHash, MurmurHash and SipHash. In one embodiment, the default fingerprint limit is set to $f_{max}=64$ bits, which provides a collision rate of $1/2^{64}$.

At block 150, testing logs are obtained from one or more sources. Each testing log can include a time stamp and text content with one or more fields. In one embodiment, the testing logs include heterogeneous logs. The one or more sources can include arbitrary and/or unknown systems or applications.

At block 160, the testing logs are parsed into fields. The testing logs can be parsed based on regular expression rules, similar to how the training logs can be parsed as described at block 120. The testing logs can be parsed without any prior knowledge of the testing log structures (e.g., format). If patterns are not provided (e.g., by a user), patterns can be automatically generated. In addition, log-to-pattern mapping can be efficiently identified, which can indicate the pattern(s) to be used to parse testing log content.

Further details regarding block 160 are described above with reference to FIG. 2.

At block 170, anomaly detection is performed on the fields of the parsed testing logs based on the at least one (modified) model. One or more anomalies are output if the parsed log content from the testing logs violates normal execution behaviors.

At block 180, user feedback is received to improve anomaly detection quality based on the anomalies output at block 170. The feedback can be used to filter out any false positive anomalies to improve anomaly detection performance.

Embodiments described herein may be entirely hardware, entirely software or including both hardware and software elements. In a preferred embodiment, aspects of the present invention are implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
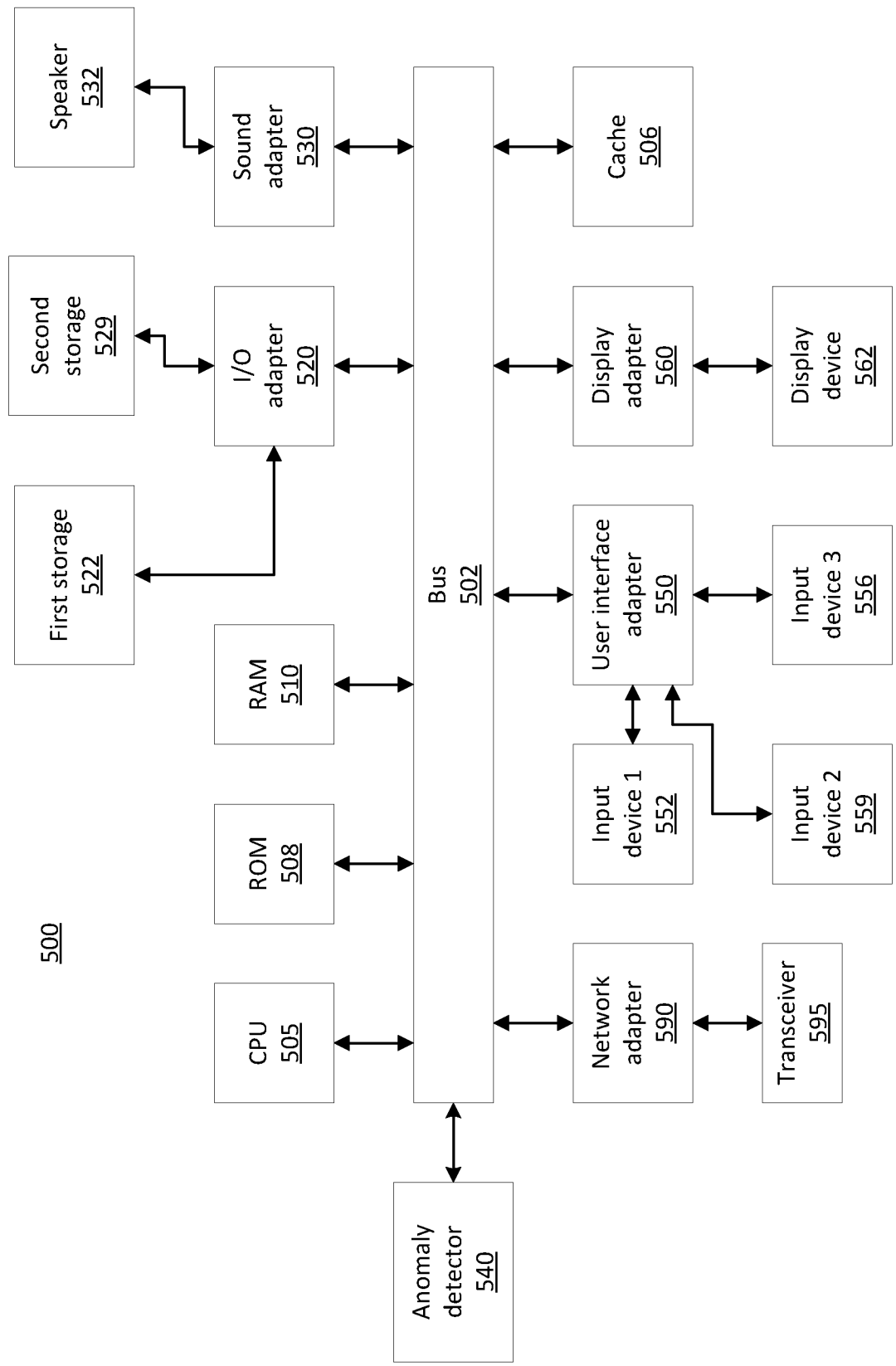
FIG. 5 is a block/flow diagram illustrating a computer system, in accordance with the present principles.

Referring now to FIG. 5, an exemplary computer system 500 is shown which may represent a server or a network device, in accordance with an embodiment of the present invention. The computer system 500 includes at least one processor (CPU) 505 operatively coupled to other components via a system bus 502. A cache 506, a Read Only Memory (ROM) 508, a Random-Access Memory (RAM) 510, an input/output (I/O) adapter 520, a sound adapter 530, a network adapter 590, a user interface adapter 550, and a display adapter 560, are operatively coupled to the system bus 502.

A first storage device 522 and a second storage device 529 are operatively coupled to system bus 502 by the I/O adapter 520. The storage devices 522 and 529 can be any of a disk storage device (e.g., a magnetic or optical disk storage device), a solid state magnetic device, and so forth. The storage devices 522 and 529 can be the same type of storage device or different types of storage devices.

A speaker 532 may be operatively coupled to system bus 502 by the sound adapter 530. A transceiver 595 is operatively coupled to system bus 502 by network adapter 590. A display device 562 is operatively coupled to system bus 502 by display adapter 560.

A first user input device 552, a second user input device 559, and a third user input device 556 are operatively coupled to system bus 502 by user interface adapter 550. The user input devices 552, 559, and 556 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 552, 559, and 556 can be the same type of user input device or different types of user input devices. The user input devices 552, 559, and 556 are used to input and output information to and from system 500.

An anomaly detector 540 may be operatively coupled to system bus 502. The anomaly detector 540 is configured to perform the operations described above with reference to FIGS. 1-4. The anomaly detector 540 can be implemented as a standalone special purpose hardware device, or may be implemented as software stored on a storage device. In the embodiment in which the anomaly detector 540 is software-implemented, although the anomaly detector is shown as a separate component of the computer system 500, the anomaly detector 540 can be stored on the first storage device 522 and/or the second storage device 529. Alternatively, the anomaly detector 540 can be stored on a separate storage device (not shown).

Of course, the computer system 500 may also include other elements (not shown), as readily contemplated by one of skill in the art, as well as omit certain elements. For example, various other input devices and/or output devices can be included in computer system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 500 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for implementing content-level anomaly detection for devices having limited memory, comprising:
   generating, by a processor operatively coupled to a memory, at least one log content model based on training log content of training logs obtained from one or more sources associated with the computer system;
   transforming, by the processor, the at least one log content model into at least one modified log content model to limit memory usage;
   performing, by the processor, anomaly detection for testing log content of testing logs obtained from one or more sources associated with the computer system based on the at least one modified log content model; and
in response to the anomaly detection identifying one or more anomalies associated with the testing log content, outputting, by the processor, the one or more anomalies; and
parsing the training log content, wherein the at least one log content model is generated based on the parsed training log content;
wherein parsing the training log content includes:
   tokenizing the training logs to generate respective tokens;
   generating a compact signature for each of the training logs based on the tokens;
   determining a uniqueness of each compact signature by looking up an index using the corresponding compact signature;
   generating a regular expression for each unique signature from the associated tokens; and
   performing log field recognition from the regular expressions to recognize one or more fields.

2. The method as recited in claim 1, wherein tokenizing the training logs includes:
   splitting each of the training logs based on a delimiter;
   detecting a set of data types; and
   replacing real values of each data type with a name of the data type.

3. The method as recited in claim 1, wherein generating the compact signature for each of the training logs includes combining all of the tokens of the training log into a single word, and applying a function to the single word to generate a unique numerical value.

4. The method as recited in 1, wherein generating the at least one log content model includes:
   indexing each of the training logs based at least in part on the one or more fields; and
   in response to indexing each of the training logs, setting an attribute for each field during testing, wherein the attribute for a given field is determined based on a randomness of the given field.

5. The method as recited in claim 4, wherein the attribute for the given field is determined to be IGNORE in response to the randomness of the given field exceeding a threshold randomness value.

6. The method as recited in claim 4, wherein the given field is a nonnumeric field, and wherein the attribute for the given field is determined to be MEMBERSHIP_TEST in response to the randomness of the given field being less than or equal to the threshold randomness value.

7. The method as recited in claim 4, wherein the given field is a numeric field, wherein the attribute for the given field is determined to be RANGE_CHECK in response to determining that a cardinality for the given field exceeds a threshold cardinality value or includes at least one floating-point number, or passes a coefficient of variation (COV) test, and wherein the attribute of the given field is determined to be MEMBERSHIP_TEST otherwise.

8. A computer program product comprising a non-transitory computer readable storage medium having program instructions embodied therewith, the program instructions executable by a computer to cause the computer to perform a method for implementing content-level anomaly detection for devices having limited memory, the method comprising:
   generating at least one log content model based on training log content of training logs obtained from one or more sources associated with the computer system;
   transforming the at least one log content model into at least one modified log content model to limit memory usage;
   performing anomaly detection for testing log content of testing logs obtained from one or more sources associated with the computer system based on the at least one modified log content model; and
in response to the anomaly detection identifying one or more anomalies associated with the testing log content, outputting the one or more anomalies; and
further comprising parsing the training log content, wherein the at least one log content model is generated based on the parsed training log content, and wherein parsing the training log content includes:
   tokenizing the training logs to generate respective tokens;
   generating a compact signature for each of the training logs based on the tokens;
   determining a uniqueness of each compact signature by looking up an index using the corresponding compact signature;
   generating a regular expression for each unique signature from the associated tokens; and
   performing log field recognition from the regular expressions to recognize one or more fields.

9. The computer program product as recited in claim 8, wherein tokenizing the training logs includes:
   splitting each of the training logs based on a delimiter;
   detecting a set of data types; and
   replacing real values of each data type with a name of the data type.

10. The computer program product as recited in claim 8, wherein generating the compact signature for each of the training logs includes combining all of the tokens of the training log into a single word, and applying a function to the single word to generate a unique numerical value.

11. The computer program product as recited in claim 8, wherein generating the at least one log content model includes:
   indexing each of the training logs based at least in part on the one or more fields; and in response to indexing each of the training logs, setting an attribute for each field during testing, wherein the attribute for a given field is determined based on a randomness of the given field.

12. The computer program product as recited in claim 11, wherein:
in response to the randomness of the given field exceeding a threshold randomness value, the attribute for the given field is determined to be IGNORE; and
in response to the randomness of the given field being less than or equal to the threshold randomness value:
if the given field is a nonnumeric field, the attribute for the given field is determined to be MEMBERSHIP_TEST; and
if the given field is a numeric field, the attribute for the given field is determined to be RANGE_CHECK in response to determining that a cardinality for the given field exceeds a threshold cardinality value or includes at least one floating-point number, or passes a coefficient of variation (COV) test, and the attribute of the given field is determined to be MEMBERSHIP_TEST otherwise.

* * * * *